Sept. 30, 1924.
F. E. HOSMER
RECOVERING GASOLINE
Filed May 4, 1922
1,510,433
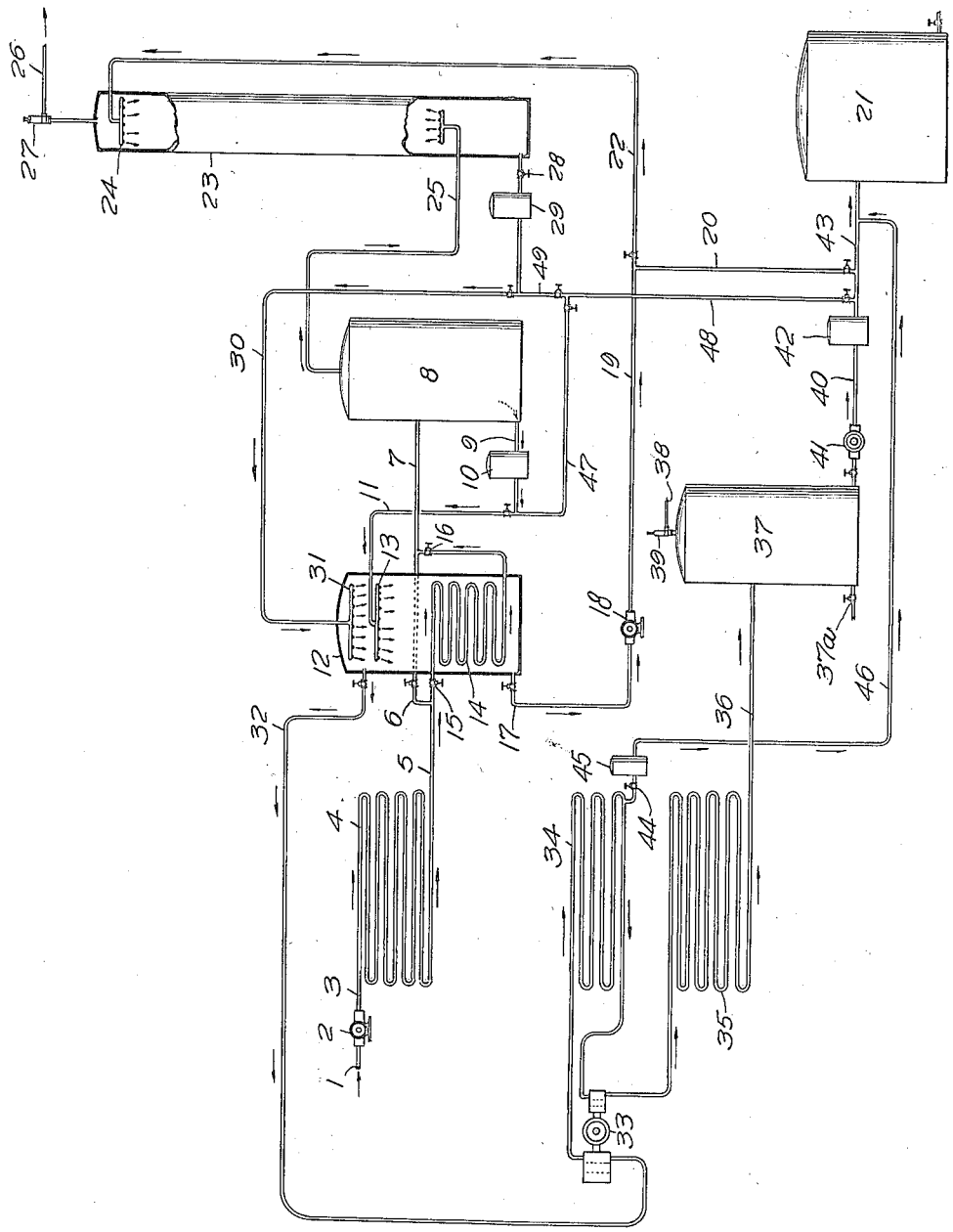
Inventor
FRED E. HOSMER,
By K. P. McElroy,
His Attorney Patented Sept. 30, 1924.

1,510,433

UNITED STATES PATENT OFFICE.

FRED E. HOSMER, OF SHREVEPORT, LOUISIANA.

RECOVERING GASOLINE.

Application filed May 4, 1922. Serial No. 558,329.

*To all whom it may concern:*

Be it known that I, FRED E. HOSMER, a citizen of the United States, residing at Shreveport, in the parish of Caddo and State of Louisiana, have invented certain new and useful Improvements in Recovering Gasoline, of which the following is a specification.

This invention relates to recovering gasoline; and it comprises a process of recovering volatile oils from natural gas, refinery gas, etc., wherein such gas is submitted to compression and cooling to recover a condensate and is thereafter scrubbed with higher boiling constituents of such condensate to recover a further quantity of gasoline; and it also comprises apparatus convenient in the performance of such process; all as more fully hereinafter set forth and as claimed.

As is well known, large amounts of gasoline ("casing head") are recovered from natural gas in various ways. This gasoline is composed of many different hydro-carbon oils of varying volatilities; its particular character in each case depending upon the particular gas under treatment and the particular method adopted in recovery. Sometimes recovery is by pressure and cooling; sometimes by intense cold, and very frequently by the use of both. In another way of recovering gasoline, wash oils are used; the gas being scrubbed with a heavy petroleum oil which absorbs the gasoline. Afterwards the charged oil is heated to distil off the gasoline and fit the oil for reuse. All these methods have their practical inconveniences. High pressure and high refrigeration require an extensive plant and the same is true of the absorption method using heavy oil. In addition, the absorption methods require a distilling plant and consumption of considerable fuel.

The gasoline produced by any of these methods, is, as stated, a mixture of many oils of differing volatility; and for commercial purposes it commonly needs further treatment. Quite commonly it is "wild"; that is, it contains enough gases and very volatile oils to boil at ordinary air temperatures; and in this event, it must be "weathered" to remove greater or less amounts of very volatile bodies. Where it is made by the absorption process, it often contains some of the oil used in absorption or of its products of decomposition; it being difficult to heat any of these oils without more or less breaking down even at the low distillation temperatures usually employed.

It is the object of the present invention to provide a method of and means for recovering gasoline from natural gas, this method also being applicable to refinery gases and other gases carrying vapors of volatile bodies. In this method, pressure, cooling and absorption are all used, but the product itself is relied upon to furnish the absorbing oil.

In compressing and cooling a "wet" natural gas, even at moderate pressures and not very low temperatures, there is always a separation of liquid. Further compression and further cooling will give more condensation; but there is always some separation with moderate pressure and cooling, as stated. This condensate may be regarded as composed partly of the less volatile oils whose vapors occur in the gas and of the more volatile oils taken up therein by absorption or solution. For the sake of nomenclature, these two portions may be respectively designated as the low volatile oils and high volatile oils. Actually, of course, both portions or fractions are usually highly volatile; but one is more volatile than the other, and these terms are convenient. With such a condensation, of course, much or most of the high volatile oils escape liquefaction and pass forward with the gas.

In the present invention, I submit the gas to a moderate pressure, and cool, thereby causing a condensation. Almost any convenient low degree of pressure may be used, say, from 5 to 50 pounds. High pressure may, of course, be used, and in certain cases is advantageous but generally I do not use more than a moderate compression. This condensate will be of low volatile oil saturated with high volatile oil. I remove it and release the pressure or expose it to suction. I may heat it more or less to compensate for the absorption of heat in evaporation, but ordinarily this is not desirable. Self-evaporation separates it into vapors of high volatile oil which are elsewhere condensed and stored and a residue of low volatile oils. If no heating is resorted to this residue will be quite cold. This residual oil, or part of it, is used to scrub the gas separated from the first condensation, thereby absorbing the residual uncondensed vapors of high volatile oils, or most of them. The charged low volatile oil coming from the scrubbing apparatus is again exposed to self-evaporation, the vapors of high volatile oils being once more sent to condensation and to storage, while the residual low volatile oils, or some of them, can be reused for absorption. Operating in this manner, it will be observed that I utilize low pressure, moderate cooling and absorption, using for absorption, however, nothing foreign to the gasoline to be produced; and that I directly produce two different products from my process: one being low volatile oils needing no weathering and the other, high volatile oils which can be used for any purpose desired. The two products can be blended with each other, or with other oils, in any proportions desired to give products of any desired specific gravity or Baumé.

In the accompanying drawing I have shown, more or less diagrammatically, apparatus within the described invention and capable of use in performing the described process. The view is a conventionalized and diagrammatic showing in elevation, partly in section.

In the showing, gas from a suitable source (not shown) enters the system by pipe 1 on the suction side of pump or compressor 2 which is operating under any pressure desired. Ordinarily, rather low pressures are used, say, 5 to 50 pounds, although of course higher may be employed. Gas leaves the pump through pipe 3 and is cooled in diagrammatically shown cooler coils 4. Cooled compressed gas passes by pipe 5 provided with valved continuations 6 and 7 to accumulating tank 8, wherein separation of condensate from the gas takes place. Liquid passes by pipe 9 past trap 10 communicating with valved line 11. As shown, this line 11 enters a stripping tank 12 and supplies a diagrammatically shown spraying device 13. The condensate in the accumulating tank is that previously described as a composition of low volatile oils and high volatile oils. In the stripping tank high volatile oils are vaporized and the low volatile oils in a cool condition accumulate at the base of the stripping tank. The cooling action in the stripping tank may be utilized in giving further cooling to the compressed gas entering the system. For this purpose, a cooling coil 14 is provided in the stripping tank. Valved by-pass 15 allows the compressed gas to be sent through this coil. By this arrangement, the heat abstracted from the gas in 14 is utilized in the stripping action in tank 12. The cooled gas from 14 may be returned by valved line 16 to the line (7) going to the accumulator tank. The stripped low volatile oils from the stripping tank are removed through valved line 17 with the aid of pump 18. The oils, or some portion of them, may go via pipes 19 and 20 to a stock tank 21. A portion of the stripped oil is taken by pipe 22 and used for scrubbing the gas coming from the accumulator tank and still containing vapors of high volatile oils. For this purpose, the diagrammatically shown scrubbing tower 23 is provided. As shown, the scrubbing oils enter through spraying device 24. The gas to be scrubbed coming from the accumulating tank (8) by pipe 25 passes upward through the scrubbed in counter current to the descending oil. Scrubbed gas leaves the system through pipe 26 provided with reducing valve 27. Low volatile oil used in scrubbing, which is now charged with high volatile oils, leaves the scrubber through pipe 28 and, passing trap 29, may be sent to the stripping device through pipe 30 having spraying means 31 within the stripping tank (12). The vaporized high volatile oils from the stripping tank pass via pipe 32 to 2-stage compressor 33. This compressor maintains suction in the stripping tank 12. The compressed vapors pass through cooler 34 and return to compressor 33. They are there further compressed and are again cooled in cooler 35. The condensate formed passes through line 36 to stock tank 37. Any uncondensed gases are led to a place of disposition (not shown) by pipe 38 provided with reducing valve 39. Condensed high volatile oils may be removed from this stock tank and sent to a place of disposition (not shown) by valved pipe 37ª. Or the high volatile oils may be removed through pipe 40 with the aid of pump 41 and, passing trap 42, may be sent by line 43 to the first stock tank (21) mentioned for readmixture, in such proportion as may be desired, with the low volatile oils therein accumulating. A by-pass line is provided whereby oils condensed in the first stage of compression and cooling in the 2-stage compressor 33 may also be sent to this stock tank (21). These oils condensed in the first stage of the compression are richer in low volatile oils than those formed in the second stage of compression. This by-pass line comprises valved line 44 communicating with the first cooling coil (34), a trap 45 and pipe 46, shown as communicating with pipe 43. Special connections are provided whereby condensate from the accumulator tank (8) may be sent directly to the stock tank (21) without stripping. For this purpose, valved pipe 47 is provided communicating with line 11 beyond trap 10. Mixed high volatile oils and low volatile oils withdrawn by this line 47 may pass, via pipes 48 and 43, to stock tank (21). In a similar way, charged oil from the scrubber may be diverted by valved cross connection at 49 and sent to the stock tank 21, via pipes 48 and 43.

For simplicity of illustration, I have shown but two stock tanks 37 and 21, but it will of course be understood that as many more may be employed as may be desired. As described, stock tank 37 serves primarily for the collection of high volatile oils and tank 21 of low volatile oils or of a mixture of low volatile oils and high volatile oils. The two tanks 37 and 21 may be reserved respectively for high volatile and low volatile oils and as many more tanks provided for blended products as may be desired.

In the use of the described apparatus and in the performance of the present process, it is not necessary to use any high degree of pressure, although such high pressure may be employed; good results may be attained without more pressure than is required to produce forward movement of the gas under treatment. Simple cooling and absorption may be relied upon. It is, however, usually convenient to employ some pressure; and of course to the extent that it is used, cooling and absorption are made more efficient. The line or well pressure on the gas may be sufficient to enable operation of the described apparatus.

What I claim is:—

1. In the recovery of gasoline from gas the process which comprises compressing and cooling the gas, separating the condensate formed from the residual gas, evaporating high volatile oils from the condensate to form a residue of low volatile oils and scrubbing the residual gas with the said low volatile oils.

2. In the recovery of gasoline from gas, the process which comprises cooling such gas, separating the condensate thereby formed from the residual gas, evaporating the high volatile oils from such condensate and scrubbing the residual gas with the residual low volatile oil.

3. In the recovery of gasoline from gas, the process which comprises cooling such gas, separating the condensate formed from the residual gas, evaporating high volatile oil from such condensate in cooling relation to such gas to aid in the stated cooling, and scrubbing the residual gas with the residual low volatile oil of such condensate.

4. In the recovery of gasoline from gas, the process which comprises cooling such gas, separating the condensate thereby formed from the residual gas, distilling off and recovering the high volatile oils formed from such condensate, scrubbing the residual gas with the residual low volatile oil and recondensing the vapors of the high volatile oils formed in said evaporation.

5. In the recovery of gasoline from gas, the process which comprises cooling such gas, separating the condensate thereby formed from the residual gas, evaporating the high volatile oils from such condensate, scrubbing the residual gas with the residual low volatile oil to abstract high volatile oil therefrom, evaporating the high volatile oils absorbed by the scrubbing and condensing the vapors of high volatile oils produced in said evaporating operations.

6. Apparatus for the recovery of gasoline from gas, comprising means for condensing a portion of the oils contained in the gas, means for separating the condensate from the residual gas, means for evaporating a portion of the condensate and means for scrubbing the residual gas with the residual oil.

In testimony whereof, I have hereunto affixed my signature.

FRED E. HOSMER.